United States Patent Office 3,613,192
Patented Oct. 19, 1971

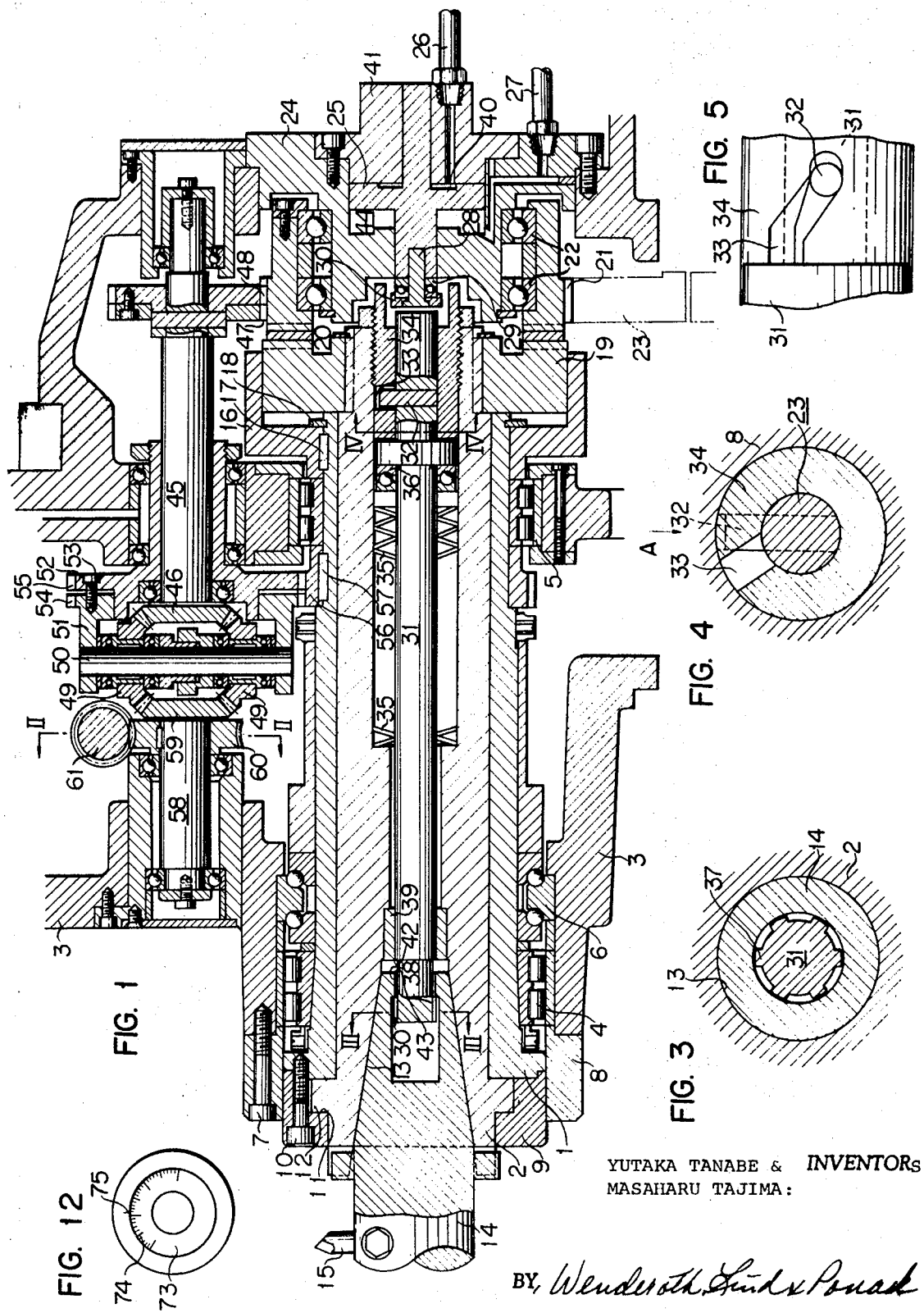

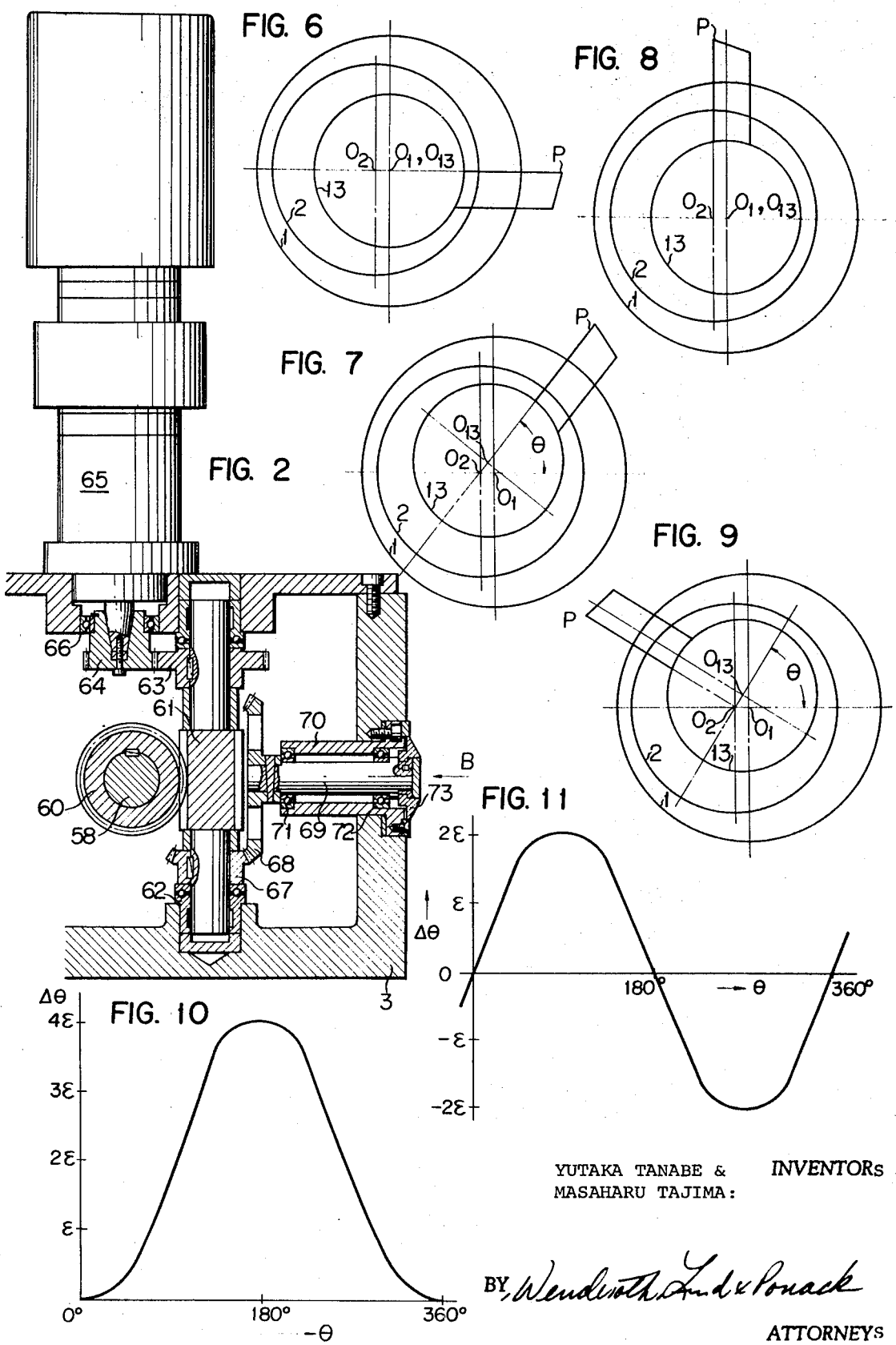

3,613,192
TOOL SPINDLE ASSEMBLY
Yutaka Tanabe and Masaharu Tajima, Kawasaki, Japan, assignors to Ikegai Tekko Kabushiki Kaisha, Tokyo, Japan
Filed July 7, 1969, Ser. No. 839,723
Int. Cl. B23b 39/02, 19/02, 47/00
U.S. Cl. 29—26
1 Claim

ABSTRACT OF THE DISCLOSURE

A main spindle device comprises a main tool spindle of such construction, wherein an inner spindle member is arranged in a rotatable outer sleeve member in such a relation that the center axis of said inner member is parallel with, and eccentric by a predetermined amount to, the axis of rotation of said outer member. Said inner member is also rotatable and provided with an eccentric opening for mounting a suitable tool holder or boring bar, the eccentricity thereof relative to the center axis of said inner member being equal to said predetermined amount. Therefore the spindle device includes means for effecting any predetermined amount of relative angular deviation between said inner and outer members, so that a tool mounted on the tool holder may be accurately adjusted for a given rotational radius or a radial depth of a cut thereof.

BACKGROUND OF THE INVENTION

This invention relates to a tool spindle assembly for machine tools, such as boring, milling, drilling, tapping and reaming machines, and more particularly to a main spindle device for numerically controlled machine tools of the above kinds, in which, when carrying out a boring or female thread cutting operation for example, a boring or cutting tool can be accurately adjusted radially of a bore, even when the main spindle is rotating. One specific embodiment of the invention is directed to improvements in a boring machine.

In a boring operation, it is essential to allow a boring tool to be moved accurately radially of a bore in order to provide a workpiece with a high precision bore. For this purpose, there have been proposed several kinds of main spindles having the various general constructions as follows:

(I) A boring tool itself, attached to the forward end of the boring bar in driving relationship with a main spindle, is adapted to be moved radially into adjusted position by the adjustment of means such as a screw or the like.

(II) A main spindle is provided at the forward end thereof with a boring bar holder provided with a bored opening therein, the axis of said opening being parallel with and eccentric to the axis of rotation of said main spindle, to thereby allow a radially adjustable boring bar to be fitted into said opening to revolve on the axis of the main spindle.

(III) A main spindle is provided at the forward end thereof with a facing attachment having a tool slide, which holds a boring tool and is adapted to be moved radially by means such as a screw.

These conventional devices, however, have many disadvantages. For example, in the arrangements (I) and (II), a machine operator is obliged to manually operate the related part or parts after the conclusion of rotation of the main spindle, in order to effect such radial movement of the boring tool. This requires a skilled machine operator and necessarily involves an expenditure of a great deal of time in effecting the above radial movement of the boring tool. In the arrangement (III), although it is possible to adjust a boring diameter during rotation motion of the main spindle, the tool slide is required to have a larger guide surface to rigidly secure the tool to the main spindle. Further, because screws and gearing for the tool slide must be provided at the forward portion of the main spindle, the distance between the tool tip and the spindle bearing becomes inevitably increased, resulting both in difficulty in machining the workpiece at a position near the main spindle, and in an increase in an amount of deflection at the tool tip.

SUMMARY OF THE INVENTION

A primary object of the invention is to provide a tool spindle assembly capable of fine adjustment for effecting a boring diameter for a boring operation, and which can overcome the abovestated disadvantages of the known conventional devices.

Another object of the invention is to provide in a tool spindle assembly a main spindle device capable of effecting the fine adjustment of a boring diameter during a boring operation without stopping rotation of the main spindle.

Still another object of the invention is to provide a main spindle device, in which the fine adjustment of a boring diameter during a boring operation may be carried out by hand by a machine operator, or by the use of a servomotor driven from the outside of the device, or in accordance with predetermined command signals such as programmed on a tape.

Yet another object of the invention is to provide a main spindle device, in which the tool not only may coincide in its rotational axis with the axis of rotation of the main spindle so as to carry out drilling, tapping, reaming, milling, etc., but also may be adjusted radially for effecting a radial depth of a cut thereof so as to carry out boring.

And another object of the invention is to provide a main spindle device, in which the main spindle may be designed to have a high degree of rigidity so that the fine adjustment of a boring diameter can be effected in a boring operation while deflection at the tool tip is decreased.

And still another object of the invention is to provide a main spindle device which is improved so that the fine adjustment of a boring diameter can be effected in a boring operation whereby the forward portion of the main spindle is capable of coming nearer to the workpiece in operation.

A further object of the invention is to provide a main spindle device in which the fine adjustment of a boring diameter can be effected in a boring operation and including indexing or indicating means whereby an adjusted amount of the diameter is adapted to be indicated externally of the device.

In carrying out our invention in a preferred form thereof, we provide a main spindle device for a machine tool, for example a boring machine, comprising a main spindle of a novel construction which consists of a rotatable outer sleeve member, and an inner spindle member disposed in a parallel relationship in said outer member with a predetermined eccentricity relative to the axis of rotation of said outer member, on which said inner member is revolvable in operation, said inner member being provided with an eccentric opening having a center axis parallel with, and eccentric by an amount equal to that of said predetermined eccentricity to, the center axis of said inner member.

The main spindle device further comprises means for setting a tool, a toolholder or a boring bar in said opening in the inner member, means for providing any amount of relative angular deviation between said inner and outer members, and means for indexing said amount or an equivalent amount externally of said device. Because of such arrangement of the main spindle, in the case where there is to be no relative angular deviation between said members, the tool connected to the inner member can rotate without any eccentricity, that is, the rotational axes of the tool and outer member coincide with each other. In contradistinction to the above case, when said members are to be provided therebetween with any amount of relative angular deviation, the tool can be revolved on the axis of rotation or center axis of said outer member with an eccentricity corresponding to said amount of deviation, whereupon the fine adjustment of the boring diameter can be effected.

According to one aspect of the present invention, a distance along which the inner member is carried by the outer member may be freely determined to have a considerable amount of length without exerting any influence upon approachability of the forward end of the main spindle to the workpiece, as well as upon the distance from front bearings for the main spindle to the tool tip. Thus, it is possible to design the spindle with great rigidity, so that a high degree of accuracy of the main spindle can be maintained for a main spindle life while greatly minimizing the amount of deflection developed at the tool tip. Its attendant advantage is that the main spindle can perform high precision machining. In addition, since the center axis of the tool setting taper opening of the inner member may completely coincide with the axis of rotation of the main spindle comprising said inner and outer members, tools such as a milling cutter, a tap, a drill, a reamer, etc. may be used without necessity of any special tool holder therefor. Further, since the main spindle device itself has means for accurately adjusting a diameter of a hole for a precise boring, the tool may be set with ease.

According to another aspect of the present invention, since the depth of cut of a cutting tool can be numerically controlled, the present invention is suitable for use in association with the main spindle device for machining centers.

BRIEF DESCRIPTION OF THE DRAWINGS

These and other objects of this invention will become more readily apparent upon a reading of the following description and upon reference to the accompanying illustrative drawings, in which:

FIG. 1 is a longitudinal section of a main spindle device embodying the invention, shown, applied to a boring machine for example;

FIG. 2 is a cross section, through the eccentricity controlling mechanism, taken on the line II—II of FIG. 1;

FIGS. 3 and 4 are cross sections, on an enlarged scale, through means for setting a boring bar, taken on the lines III—III and IV—IV of FIG. 1, respectively;

FIG. 5 is a view of a cylindrical cam, looking in the direction indicated by the arrow A in FIG. 4, with the spindle member removed;

FIGS. 6, 7, 8 and 9 are explanatory drawings, from which it will be understood that any preferred fine adjustment of the boring diameter in a boring operation can be effected due to the presence of eccentricity between the center axes of the boring bar and outer sleeve member;

FIGS. 10 and 11 graphically illustrate relations between an adjusted amount of boring diameter and a relative angular deviation of the inner and outer members; and FIG. 12 is a view of the calibrated indicating disc, looking in the direction of the arrow B in FIG. 2.

DESCRIPTION OF THE PREFERRED EMBODIMENT

Referring now to the drawings and FIG. 1 in particular, there is illustrated a main spindle device constructed in accordance with the principle of the invention, which comprises a main spindle consisting of a sleeve 1 with an eccentric through opening, and a spindle 2 disposed into said sleeve in a relationship as mentioned hereinafter. Within a spindle head body 3 the sleeve 1 is supported by a plurality of bearing means, such as double row cylindrical roller bearings 4, 5 and a thrust ball bearing 6. Secured by bolt means 7 to the lefthand end face of the spindle head body 3 is an annular flange member 8 which is subjected to a thrust force on the sleeve 1 through the outer race of the bearing 4 and a collar. The spindle 2 is revolvingly arranged in the eccentric opening of the sleeve 1 in parallel relationship therewith, and between the center axes of the sleeve 1 and spindle 2 there is provided a predetermined eccentricity. A thrust pad 9 encircled by the flange 8 is tightly secured to the lefthand end face of the sleeve 1 by suitable means such as screws 10. Obviously, since the thrust pad 9 is formed with an annular stepped portion 11 abutting against a corresponding circumferential projection 12 of the spindle 2, the latter can be prevented in its axial movement by the thrust pad 9.

The spindle 2 is provided at the lefthand portion thereof with a taper opening 13 in which a boring bar 14, with a conventional tool 15 fixed thereto in a usual manner is mounted in a manner, as described hereinafter. The center axis of said taper opening 13 is parallel to, and separated from the center axis of the spindle by an amount of eccentricity equal to that of said sleeve and spindle eccentricity. Consequently, it can be understood that the axis of rotation or center axis of the sleeve, may, if desired, exactly coincide with the center axis of the tool mounting tapered hole 13. If the sleeve and spindle members are maintained in a relative angular position where said center axes of the opening and sleeve coincide with each other, the boring bar 14 received in said taper opening 13 can be operated with no eccentricity with respect to the axis of rotation or center axis of the sleeve. Thus, the main spindle is applicable to tools for performing a usual milling, boring, drilling, tapping or reaming operation.

On the righthand portion of the outer sleeve member 1, there is mounted a balance collar 16 of a substantially cup shape, which is keyed for rotation as at 17 and arranged between the bearing 5 and disc-shaped collar 18 against axial movement. Positioned within the balance collar 16 is a coupling flange element 19 forming a portion of a usual Oldam's coupling. The element 19 is mounted on the spindle 2 in spline connection therewith and disposed between the righthand end face of the sleeve 1 and a collar 20, thereby preventing axial movement thereof. A cup-shaped driven gear 21 is supported by two radial ball bearings 22 within the splindle head body 3 to mesh with a driving gear 23. The element 19 and gear 21 as well as an intermediate element 24 therebetween form the usual Oldam's coupling, and therefore rotation of the driving gear 23 caused by a prime mover (not shown) may be imparted through the gear 21 and Oldam's coupling to the spindle 2 which is centrally connected to the element 19.

The driving gear 23 is partly shown in a downward position of FIG. 1, but the driving gear 23 and a transmission gearing therefor are of the conventional construction and need not be further described.

Means are provided for mounting within the spindle 2 the boring bar 14 or a suitable tool holder. The means comprises a gear holder 24 supporting said bearings 22 functioning also as a linear hydraulic cylinder, which contains a piston 25 hydraulically controlled in its axial movement by pressure fluid, such as pressured oil, supplied through passageways 26 and 27. Embedded in the elongated lefthand end face of said piston 25 is a pin 28 carrying a thrust ball bearing 29, which can push through a cover member 30 against a bar member or drawbar 31 in axial direction in response to the movement of the piston 25, the cover member being fitted onto the lefthand race of said bearing 29. As better shown in FIGS. 4 and 5, said drawbar 31 is provided with a radially extending pin or cam follower 32 fitted slidably in a cam slot 33 provided in a cylindrical cam 34 which cam is screw threaded into the end of spindle 2. Because of means of this construction, when the drawbar 31 is axially moved, for example from left to right in FIG. 5, the pin 32 fixed on the bar 31 is guided along the path or cam slot 33 while turning through 30° (angle of turning of the pin 32 may be 90°, 150°, 210°, ...) in a direction depending on that of the movement of the spindle. Within an opening (which is associated with the taper opening 13) internally of the spindle 2, there are resilient means such as a plurality of dish-like springs 35, which slidably encircle the drawbar 31 and tend to continuously force the drawbar 31 through a thrust ball bearing 36 in the rightward direction. For this purpose, the bearing 36 is arranged to contact with an enlarged collar portion of the drawbar 31.

As shown in FIGS. 1 and 3, the drawbar 31 is formed at its forward portion with a splined portion 37—in this example it is of 6-spline type—and the boring bar 14 is also formed with a complementary-shaped splined central bore 38. A bushing 39 is provided for supporting the drawbar 31.

The splined portions 37 and 38 are shown here to be of 6-spline type and therefore the drawbar 31 must be turned through 30° for each axial movement of the piston 25. The splined portions 37 and 38 will generally be of 4, 8, 10, etc. spline type, but this invention is not to be limited to any particular number of teeth. In the case of a 4-spline type for example, it will be apparent that the drawbar must be turned through 45° for each axial movement of the piston 25.

The means thus far described is operated as follows: When the pressure fluid is introduced into a working chamber 40 (which is defined by an inner surface of a cylinder cover 41 and the piston 25) through the fluid passageway 26, the piston 25 is acted upon by the pressure oil and forced in the forward direction; the piston 25 then pushes the drawbar 31 in the same direction against the action of the dish-like springs 35 while at the same time the drawbar 31 is turned by the angle of 30° because of the engagement of its pin 32 with the cam slot 33. Before the arrival of the piston 25 at its stroke end, a stepped portion 42 of the drawbar 31 provided in the vicinity of its forward portion can strike against the boring bar 14 at a backward end face 43 thereof, thereby to facilitate disengaging the boring bar 14 from the eccentric taper opening 13 of the spindle. In this case, each groove or tooth of the splined bore 38 becomes aligned with each associated tooth or groove of the splined portion 37, so that the boring bar 14 can be detached from the spindle 2.

In contradistinction to the above, when pressure fluid is supplied to the passageway 27 and the pressure fluid in the chamber 40 is exhausted therefrom, the pressure oil in the passageway 27 is introduced into a forward working chamber 44, and the piston 25 is forced in the reverse or rightward direction by means of the combined forces from the actions of the springs 35 and pressured oil, while at the same time the drawbar 31 is turned by the angle of 30° in the reverse direction, thereby to cause each tooth or land of the splined portion 37 of the drawbar to interlockingly abut against each associated tooth or land of the splined bore 38 of the boring bar 14. Thus, the drawbar 31 can draw the boring bar 14 into the taper opening 13 and is stopped in position, while the piston 25 is further slightly retracted until the bearing 29 mounted on the piston is disengaged from the backward end face of the drawbar 31.

In an upward position as shown in FIG. 1, there is a differential gear mechanism for providing a relative angular deviation between inner and outer members 1 and 2, comprising an input shaft 45 provided at the lefthand end with a bevel gear 46 and at the other end portion with a pair of connected spur gears 47, 48 each meshing with the gear 21. The spur gear 47 is in an angular position slightly different from that of the other gear 48, that is, the teeth of both gears 47 and 48 are staggered relative to each other through an amount sufficient to prevent the occurrence of backlash between the gear 21 and the spur gears 47, 48, thereby eliminating boring diameter errors arising from said backlash. The differential gear mechanism further comprises planetary pinion gear 49 meshing with said bevel gear 46 and mounted for rotation on a pinion gear shaft 50 by means of thrust ball bearings and needle roller bearings as in FIG. 1, the shaft 50 being mounted in a planetary gear housing consisting of members 51 and 52 connected with each other by suitable bolt means as at 53. Said housing members 51 and 52 are integrally provided on the periphery thereof with ring gears 54 and 55, respectively, meshing with a gear 56 rigidly fitted by a key 57 onto the sleeve 1. For the purpose of preventing the occurrence of backlash, the teeth of both gears 54 and 55 are slightly staggered with each other as in the case of gears 47 and 48.

The differential gear mechanism further includes a second input shaft 58 formed with a bevel gear 59 (similar to the gear 46) meshing with said planetary pinion gars 49. As will be understood from FIG. 1, said shafts 45, 58 and housing members 51, 52 are, respectively, supported for rotation by suitable bearing means in the spindle head body 3.

In FIGS. 1 and 2, mounted on the shaft 58 is a keyed worm wheel 60 meshing with a worm shaft 61, which is rotatably supported in the spindle head body 3 by means of combined thrust ball and needle roller bearings 62. A gear 63 is rigidly secured on the leftward portion of the worm shaft 61 in FIG. 2 and meshes with a gear 64 driven by a numerically controlled electric motor 65. The gear 64 is carried by a ball bearing 66 in the spindle head body. On the righthand portion of the worm shaft 61, there is rigidly mounted a bevel gear 67 meshing with another bevel gear 68 connected to one end of a rotatable pin shaft 69. The pin shaft 69 is supported within a sleeve 70 by radial ball bearings 71, 72 and provided at the top or other end thereof with a calibrated disc 73 which is preferably located outside of the spindle head body 3. The sleeve 70 is fixed to the spindle head body 1 in any conventional or suitable manner.

Relations of tooth numbers among the above described gears are $$n_1 = n_2 \tag{1}$$

$$n_3/n_4 = 2n_5/n_6 \tag{2}$$

where $n_1$ to $n_6$ are the numbers of teeth in the gear 46, 59, 21, 47 (or 48), 56, and 54 (or 55), respectively.

From the above equations, it will be understood that, if the numerically controlled motor 65 is stationary and therefore the shaft 58 is not rotated by the motor, upon rotation of the driving gear 23, the sleeve 1 can be rotated in the same direction and at the same numbers of revolution as the spindle 2 through the gear 21 and the differential gear mechanism as if they were formed into a single unit. If the motor 65 is rotated by a controlled amount of angle, there may be provided a relative angular deviation between the spindle 2 and sleeve 1 as will be stated hereinafter. Thus, by changing a relative angular deviation between the spindle and sleeve resulting from the application of the command signals to the motor 65, the single-point tool may be adjusted radially of the bore. Since rotation of the worm shaft 61 causes rotation of the calibrated disc 73, the disc may index an amount of rotation of the motor 65 thus indexing an amount of the relative angular deviation between the spindle and sleeve. Although the motor 64 is utilized, in this embodiment, to provide the required eccentricity, a handle may be provided instead of the motor without hindrance. In the latter case, the handle will be operated manually to turn the gear 64 and successively the other gears.

Referring to FIGS. 6 and 7, in which $O_1$ represents an axis of rotation or center axis of the sleeve 1 relative to the spindle head body, $O_2$ represents a center axis of the spindle 2, $O_{13}$ represents a center axis of the tool setting taper opening 13, and P represents a tip of the boring tool 15 on the boring bar held in the taper opening, the tip P being positioned on an extension line connecting $O_2$ to $O_{13}$. In FIG. 6, the axes $O_1$ and $O_{13}$ coincide with each other, and in FIG. 7, a relative angular deviation $\theta$ is given between the sleeve and spindle.

When the tool tip P is cutting a workpiece, the diameter of revolution of the tip, that is, the boring diameter is two times $\overline{O_1P}$. In a case where the eccentricity $\epsilon = \overline{O_1O_2} = \overline{O_2O_{13}}$, a changed amount of boring diameter when the relative angular deviation is increased in angle from zero to $\theta$ is given by $$\Delta\theta = 2\left(\sqrt{\overline{O_2P}^2 + \epsilon^2 - 2\epsilon\overline{O_2P}\cos\theta} - \overline{O_{13}P}\right) \quad (3)$$

FIG. 10 shows this result, in which the axes of ordinate and abscissa mean the changed amount of boring diameter and the relative angular deviation, respectively.

FIGS. 8 and 9 correspond to FIGS. 6 and 7, respectively but the tip P is positioned on a line making an angle of 90° at $O_2$ with the line connecting $O_2$ to $O_{13}$. In this case, the angle $PO_2O_1 = 90° + \theta$ (in FIG. 9), and we get $$\Delta\theta = 2\left(\sqrt{\overline{O_2P}^2 + \epsilon^2 - 2\epsilon\overline{O_2P}\cos(90°+\theta)} - \overline{O_{13}P}\right) \quad (4)$$

This result is shown in FIG. 11, wherein the axes of ordinate and abscissa have the same meaning as in FIG. 10. As will be apparent, the curves in FIGS. 10 and 11 change in shape with a value of $\overline{O_{13}P}$, and the eccentricity $\epsilon$ can be preliminarily determined.

In order to give the operator a general idea of how much a boring diameter should be changed to obtain the desired boring diameter, an annular series of scribe marks 74 are provided on the top face of the disc 73 (FIG. 12). These scribe marks 74 may be aligned with a scribe mark 75 on the sleeve 70, to act as a kind of index and are adapted in units to correspond to a value of $\Delta\theta$.

The operation of the abovementioned embodiment, and particularly the boring operation thereof will now be described by way of example.

The boring tool of such a size substantially corresponding to the desired boring diameter (which size is in general slightly smaller than the desired boring diameter) is first set into the taper opening 13 of the spindle 1. This is accomplished by supplying the pressure fluid through the passageway 26 to the chamber 40 to push-feed the piston 25 forwardly, whereby the drawbar 31 is push-fed axially forwardly against the action of the springs 35 until the piston 25 reaches the end of its stroke returned to the starting point while at the same time the bar 31 is turned through 30° in the counterclockwise direction in FIG. 4 due to the engagement of the pin 32 with the cam slot 33, and then inserting the boring bar with the boring tool 15 into the taper opening 13 past the splined portion 37 of the bar 31, in a manner allowing each tooth of the internal spline 38 to be aligned with the associated groove of the external spline 37 by hand by the operator or otherwise automatically. After the insertion of the boring bar 14, the pressure fluid in the chamber 40 is exhausted therefrom and supplied to the other chamber 44, thereby to force the drawbar 31 to be moved back in position and to be turned in the opposite direction by 30° in the meantime. In this manner, the splined portion 37 outside the internal spline 38 can abut against the latter in push-feed relation, and consequently the boring bar 14 is drawn into the taper opening 13. The abovementioned is the complete operation of mounting the boring tool in place. Subsequently to this operation, the rotation of the driving gear 23 is transmitted to the spindle 2 through the gear 21 and the Oldam's coupling as well as to the sleeve 1 through the gear 21, the spur gears 47, 48, the bevel gear 46, the planetary pinion gears 49, the ring gears 54, 55 and the gear 56. When the shaft 58 is not rotated by the motor 65, the sleeve and spindle turn as a unit, that is, without relative motion and the boring tool 15 rotates on the center axis of the sleeve. Rough boring may be accomplished by the use of such a non-eccentric motion of the tool 15. When the spindle 2 is rotating, the drawbar 31 is rotated too at the same speed of rotation, because the cylindrical cam 34 is securely fitted into the spindle 2 and engages the pin 32 of the drawbar 31.

Having done the rough boring, the roughly bored hole is measured across its diameter with a usual device, such as an inside micrometer, a cylinder gauge, or the like, thereby to determine an amount $\Delta\theta$ of diameter to be further cut out, that is, a difference between diameters of the roughly bored hole and a required bore. Then, a value of a relative angular deviation between the spindle and sleeve, corresponding to said amount $\Delta\theta$ of diameter to be further cut, can be obtained from FIG. 10 or 11, or the Equation 3 or 4, and the motor 65 is turned by only an angle corresponding to the value $\theta$ of the relative angular deviation. As the rotation of the motor causes the rotation of the shaft 58, it will be apparent that the relative angular deviation occurs between the spindle and sleeve. Maintaining the motor stationary after the rotation of said angle and driving the spindle through the driving gear 23, the workpiece can be machined to have a hole of required diameter. In this case, the changed amount of the diameter may be indexed on the calibrated disc 73 so that it is possible externally to see the changed amount.

While the invention has been illustrated and described with reference to a single preferred embodiment thereof, is is to be understood that various changes in the details of construction and the arrangement and combination of parts may resorted to without departing from the spirit and scope of the invention.

What we claim is:

1. A tool spindle assembly for a machine tool in which various tools such as those for boring, milling, drilling, tapping, reaming, etc. are alternately set to carry out the machining of a work by their rotations, said tool assembly comprising a substantially cylindrical rotatable sleeve; a tool spindle and means to rotatably arrange it within said sleeve, with said sleeve and tool spindle having parallel axes and being spaced by a predetermined eccentricity; means for alternately coupling the tool spindle to various tools via tool holders, including an opening provided longitudinally in the tool spindle for complementally receiving said tool holder, the center axes of said opening and said tool spindle being parallel and being spaced by an amount equal to said previously determined eccentricity; an Oldam's coupling connecting a driving gear with said tool spindle to impart rotation to the tool spindle to give the tool cutting speed; a differential gear mechanism connecting the driving gear with said sleeve through a gear rigidly fixed thereto so as to rotate it in the same direction and at the same speed as said tool spindle; and means including a numerically controlled motor means connected to the differential gear mechanism for providing a required amount of relative angular deviation between said sleeve and tool spindle.

References Cited

UNITED STATES PATENTS

| 2,289,111 | 7/1942 | Fett | 90—15.2 |
| 2,558,815 | 7/1951 | Briney | 77—58.34 |
| 2,820,376 | 1/1958 | Jannenga et al. | 77—58.34 |

FRANCIS S. HUSAR, Primary Examiner

U.S. Cl. X.R.

77—3 TR, 1, 58 G; 90—15; 82—5